E. H. HAMILTON.
ELECTROLYTIC TANK FOR ELECTROCHEMICAL REACTIONS.
APPLICATION FILED OCT. 4, 1917.

1,269,078.

Patented June 11, 1918.

Inventor
Edward H Hamilton
for Chas H Riches
attorney.

UNITED STATES PATENT OFFICE.

EDWARD HENRY HAMILTON, OF TRAIL, BRITISH COLUMBIA, CANADA, ASSIGNOR TO THE CONSOLIDATED MINING & SMELTING COMPANY OF CANADA, LIMITED, OF TORONTO, ONTARIO, CANADA, A CORPORATION OF CANADA.

ELECTROLYTIC TANK FOR ELECTROCHEMICAL REACTIONS.

1,269,078.   Specification of Letters Patent.   Patented June 11, 1918.

Application filed October 4, 1917. Serial No. 194,784.

*To all whom it may concern:*

Be it known that I, EDWARD HENRY HAMILTON, a citizen of the United States of America, and resident of the city of Trail, in the District of Kootenay, in the Province of British Columbia, Dominion of Canada, have invented certain new and useful Improvements in Electrolytic Tanks for Electrochemical Reactions; and I hereby declare that the following is a full, clear, and exact description of the same.

In the electrolytic precipitation of metals in solution, physical conditions arise, through temperature variations, which not only tend to retard the precipitation of the metal on the cathodes, but in some cases tend to dissolve the metal whch may have been precipitated before the abnormal conditions arose.

For instance, in the extraction of zinc from dilute zinc sulfate solutions an increase in temperature is almost invariably accompanied by a decrease of homogeneity in the precipitated metal, which results not only in the production of weak or thin plates at the cathodes, but also results in corresponding electrical losses during the electrolysis and physical and thermal losses during the melting.

The object of the present invention, therefore, is to so construct the electrolytic tank that a uniform or substantially uniform temperature under reasonable operating conditions may be maintained throughout the electrolytic process and this object is attained by providing the tank with one or more hollow, insoluble, baffles, preferably of lead of corresponding shape and dimensions to the electrodes, and by maintaining a continuous circulation of a temperature regulating agent through it, the rapidity of the circulation of which may be regulated to the thermal conditions and requirements of the electrolysis.

In the drawings—

Figure 2:
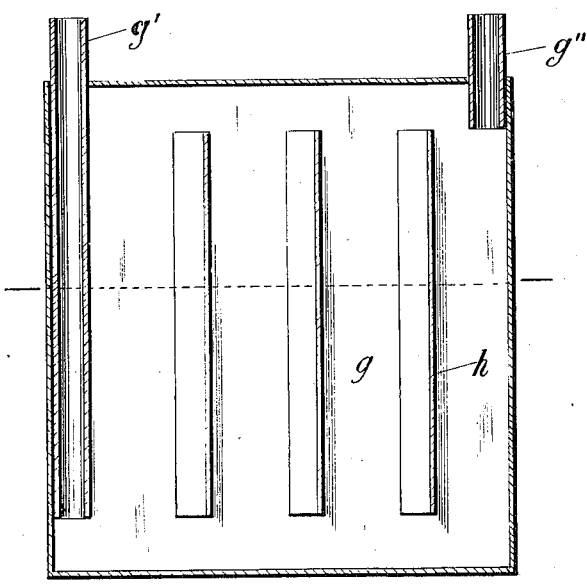
Fig. 2 is a vertical sectional elevation of the baffle on a larger scale than Fig. 1.
Figure 3:
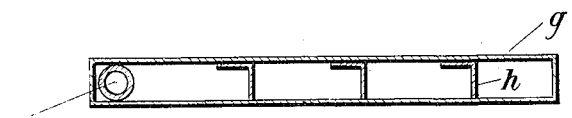
Fig. 3, is a horizontal section taken on the line *a—a*, Fig. 2.
Figure 1:
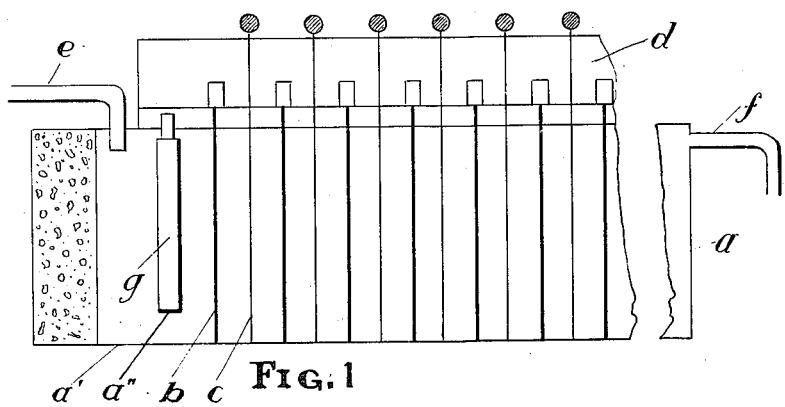
Figure 1 is a fragmentary longitudinal section of an electrolytic tank showing the arrangement of the electrodes and baffle.

*a* represents the usual electrolytic tank, *b* represents the anodes, *c* represents the cathodes and *d* the bus bars carrying the current.

The electrolyte containing the dissolved metal flows into tank *a*, through appropriate inlets *e* and out of it through appropriate outlets *f*; the electrolyte being maintained in the tank at the desired level by means of these inlets and outlets.

At the inlet end of the tank *a*, between the inlets and adjacent anode, is a baffle *g*, extending from the electrolyte level to within a desired distance of the tank bottom *a'*, this baffle directing the inflowing electrolyte downward to the opening *a''*, through which it flows into the lower part of the tank to rise between the anodes and cathodes, during its circulation from the inlets to the outlets, said baffle having no direct connection with the source of the electrical circuit for the electro-chemical reactions.

In the electrolysis of copper, the highest efficiency is obtained by maintaining the electrolyte at a relatively high temperature, but in the electrolysis of zinc the highest efficiency is obtained by maintaining the electrolyte at a relatively low temperature— this being mentioned to indicate the range of purpose for the present invention.

As explanatory, therefore, of the use of the invention, the baffle will be described in connection with the extraction of zinc from a dilute zinc sulfate solution which may be carried out according to the following equations:—

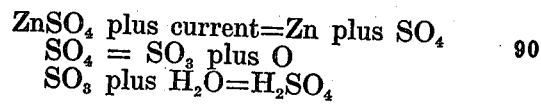

$$ZnSO_4 \text{ plus current} = Zn \text{ plus } SO_4$$
$$SO_4 = SO_3 \text{ plus } O$$
$$SO_3 \text{ plus } H_2O = H_2SO_4$$

the regenerated sulfuric acid being used for leaching fresh calcine, and the electrolysis being carried on in the usual way with insoluble lead anodes and aluminium, or zinc cathodes.

Small quantities of impurities, such as copper and iron are sometimes present in the electrolyte and are precipitated with the zinc, and tend to establish secondary currents which break up the zinc and separate it from the cathode.

During the flow of the current from the anode to the cathode, the temperature of the electrolyte rises as a result of the resistance offered to the circuit and this rise of temperature frequently attains relatively high degrees, especially in hot weather and hot climates. The result of this rise of temperature increases the affinity of the acid for the zinc, of the electrolyte, which tends to retard the precipitation at the cathodes and to dissolve the zinc which has already been precipitated. When the zinc begins to dissolve in places where there are minute particles of impurities or where the contact of the zinc with the cathode is not good, secondary currents are set up and the synchronism of the electrolytic action is upset, resulting in the precipitation of zinc at the cathodes, poor both as to quality and to quantity.
The temperature of the tank content, owing to the inflowing electrolyte, is necessarily lower at the baffle than at the discharge end of the tank, and the precipitation at the inlet end of the tank is consequently greater and more uniform than at the outlet end, primarily due to this lower temperature of the electrolyte. To regulate the temperature of the electrolyte, the baffle $g$ consists preferably of an insoluble, hollow, container with circulating pipes $g'$, $g''$, through which the temperature regulating agent may flow into and out of the container, the flow and temperature of this agent being regulated to the requirements of the reaction.
The excessive heating of the electrolyte has been found to warp the electrodes constituting the reacting couples and, these, when warped, vary the electrolyte path of the current which results in variations of precipitation throughout the cathode surfaces and tends to intensify the secondary currents above referred to.

To maintain a uniform temperature for the electrolyte throughout the depth of the tank, or at least throughout the depth of the electrodes, the baffles preferably correspond in shape and dimensions with the electrodes and to maintain a uniform temperature throughout the length of the tank, a baffle may be located at the inlet end and additional baffles may be located at other places throughout its length where an excessive rise in temperature occurs or is likely to occur.

To prevent the warping or distortion of the baffle, appropriate braces $h$ are employed, these braces being so arranged within the baffle as to permit of an unimpeded circulation of the temperature-regulating agent.

Having thus fully described my invention, what I claim as new and desire to secure by Letters Patent is:—

1. An electrolytic tank comprising a set of electrodes, constituting the reacting couples, an hollow, insoluble, baffle interposed between the tank inlet and the adjacent electrode to direct the inflowing electrolyte below the electrodes, and circulating pipes for the baffle by which the circulation of a temperature regulating agent may be maintained through it.

2. A baffle for an electrolytic tank having no direct connection with the source of the electrical circuit for the electro-chemical reactions, said baffle comprising a hollow insoluble container having an inlet and outlet for the circulation of the temperature regulating agent.

3. A baffle for an electrolytic tank comprising a hollow, insoluble, container, having an inlet and outlet for the circulation of a temperature-regulating agent, and appropriate means within the container, permitting of the circulation of said agent, and resisting the distortion of the baffle.

Dated this fifth day of September, A. D. 1917.

EDWARD HENRY HAMILTON.

Signed at the said city of Trail in the presence of—
VIOLET DALTON,
CHAS. H. RICHES.